United States Patent [19]

Lee et al.

[11] 4,138,001

[45] Feb. 6, 1979

[54] BRAKE MECHANISM

[75] Inventors: Arthur L. Lee; Arthur B. Coval, both of Columbus, Ohio

[73] Assignee: A. L. Lee Corporation, Columbus, Ohio

[21] Appl. No.: 819,461

[22] Filed: Jul. 27, 1977

Related U.S. Application Data

[63] Continuation of Ser. No. 641,941, Dec. 18, 1975, abandoned, which is a continuation-in-part of Ser. No. 508,741, Sep. 24, 1974, abandoned.

[51] Int. Cl.² .................................................. F16D 59/02
[52] U.S. Cl. ....................................... 188/170; 188/72.6
[58] Field of Search .................. 188/72.3, 72.4, 71.8, 188/72.6, 106 F, 106 P, 170; 303/6 M; 92/61, 62, 63, 64, 65, 68, 76, 130 A

[56] References Cited

U.S. PATENT DOCUMENTS

| | | | |
|---|---|---|---|
| 2,358,740 | 9/1944 | Iversen | 188/71.8 |
| 3,103,990 | 9/1963 | Wilkinson | 188/72.6 |
| 3,136,227 | 6/1964 | Williams | 92/130 A |
| 3,181,433 | 5/1965 | Cruse | 92/65 |
| 3,187,642 | 6/1965 | Cruse | 92/64 |
| 3,393,774 | 7/1968 | Masser | 188/106 P |
| 3,791,492 | 2/1974 | Neilsen | 188/170 |
| 3,908,520 | 9/1975 | Ma | 92/64 |

FOREIGN PATENT DOCUMENTS 1333062  10/1973  United Kingdom .................... 188/170

*Primary Examiner*—Edward R. Kazenske

*Attorney, Agent, or Firm*—Stanley J. Price, Jr.; John M. Adams

[57] ABSTRACT

A brake mechanism is mounted on a vehicle and includes a housing having a slot for receiving a rotatable disc to be braked. The upper portion of the housing includes a chamber for receiving pressurized fluid from a source. A spring actuated piston is slidably and sealingly disposed within the chamber. A removable spring assembly is positioned forwardly of the actuating piston and exerts a preselected spring force thereon. When the fluid pressure acting against the piston is less than the spring force applied to the piston, the piston moves axially in the chamber and a rod portion thereof contacts a lever that is pivotally mounted to the housing. The lever pivots on the housing to axially displace a brake applicator piston that is movably positioned in the housing adjacent to the rotatable disc. A plurality of braking pads are secured to the end portion of the applicator piston and additional braking pads are secured to the brake housing opposite the disc. Displacement of the applicator piston moves the braking pads into braking engagement with the disc to overcome rotation of the disc and stop the vehicle. In the event fluid pressure in the chamber diminishes, the spring assembly is automatically actuated to exert a parking brake force and move the braking pads into braking engagement with the disc. The spring assembly may be locked in a compressed state for efficient removal from the housing for maintenance or replacement and includes a device for visually indicating the wear condition of the braking pads.

5 Claims, 5 Drawing Figures

BRAKE MECHANISM

CROSS REFERENCE TO RELATED APPLICATIONS

This application is a continuation of application Ser. No. 641,941 filed on Dec. 18, 1975, entitled "Improved Brake Mechanism" which in turn is a continuation-in-part of application Ser. No. 508,741 filed on Sept. 24, 1974, entitled "Brake Mechanism," and now abandoned.

BACKGROUND OF THE INVENTION

1. Field of the Invention

This invention relates to a brake mechanism and more particularly to a brake mechanism associated with a hydraulic circuit and having a removable spring assembly operable to actuate a service brake and apply a preselected braking force to a rotating disc to automatically actuate a park brake in the event of hydraulic failure.

2. Description of the Prior Art

Conventional fluid actuated braking systems which are associated with a hydraulic circuit and are operable to brake the vehicle by applying a braking force upon a rotatable disc require the continued supply of pressurized fluid to actuate the service brake. Furthermore, once the parking brake is engaged, a loss of hydraulic power releases the parking brake, creating an unsafe situation. Thus, if a malfunction should occur which would terminate operation of the fluid pumps, such as a loss in electric power supplied to the electrically powered vehicle, the brake becomes inoperative.

In many cases, when it is required to move an inoperable vehicle having the parking brake engaged, the entire brake assembly must be dismantled to release the parking brake so that the vehicle may be towed. In addition, considerable care must be exercised to prevent explosion of the compressed brake spring. To return the vehicle to service, the brake must be reassembled. Such a procedure is time consuming and, in most cases, produces a variance in the braking force by disturbing the coordination and precision orginally established between interacting components of the brake assembly. If this hazard is to be avoided, the only alternative is replacing the inoperative brake assembly with an operative brake assembly. In most instances, installing a complete brake assembly on a vehicle in a working environment requires considerable effort resulting in loss of vehicle efficiency.

There is need for a brake mechanism operable in a hydraulic circuit that will remain operational in the event of loss of hydraulic power to the system and can be efficiently serviced without requiring extensive repair of the brake mechanism and alteration of the braking force.

SUMMARY OF THE INVENTION

In accordance with the present invention, there is provided a brake mechanism that includes a housing having a slot for receiving a rotatable disc and an open end portion. A chamber is provided in said housing for receiving pressurized fluid from a source. A plurality of braking pads are positioned in the slot oppositely of the disc. A first braking assembly is reciprocally positioned in the housing for axial movement toward and away from the disc. The first braking assembly is operable to move the braking pads into braking engagement with the disc. A second braking assembly is reciprocally positioned in the fluid chamber and applies a brake actuating force to the first braking assembly to move the braking pads into braking engagement with the disc in response to the fluid pressure in the chamber. A resilient device is releasably positioned within the housing to seal the open end portion thereof. The resilient device applies a preselected constant force upon the second braking assembly to axially displace the second braking assembly and exert a brake actuating force upon the first braking assembly when the fluid pressure in the chamber is less than the force exerted by the resilient device on the second braking assembly. The resilient device includes apparatus for maintaining the resilient device in a compressed state when removed from the housing open end portion.

The resilient device includes a spring assembly that is positioned in abutting relation with the second braking assembly that includes a piston having a rod portion. The spring assembly exerts a preselected spring force on the piston to axially move the piston within the chamber when the fluid pressure therein is less than the spring force. Axial movement of the piston extends the rod portion through an opening in the housing of the brake mechanism. The end portion of the piston rod abuts the upper end portion of an actuator lever that is pivotally mounted on the brake assembly housing. A lower end portion of the lever contacts the first braking assembly. Pivotal movement of the lever by movement of the piston rod displaces the first braking assembly to move the braking pads into frictional and braking engagement with the rotating disc.

The brake mechanism functions as a service brake to apply a preselected braking force upon the rotatable disc by discharging a preselected volume of fluid from the chamber to reduce the fluid pressure therein.

In the event of hydraulic failure and subsequent loss of fluid pressure in the chamber, the brake mechanism remains operational. With an absence of fluid pressure in the chamber to resist axial movement of the spring assembly, the spring assembly automatically exerts upon the piston a parking brake force, which is transmitted to the first braking assembly, which is axially displaced to move the braking pads in braking engagement with the disc to bring the vehicle to a stop. With this arrangement, the brake mechanism functions as an automatic parking brake and does not require the supply of fluid to the chamber to engage the brake.

The spring assembly includes a pair of annular members coaxially positioned in spaced relation on a threaded rod adjacent the second braking assembly. The first annular member is positioned in abutting relation with the piston of the second braking assembly and is secured to the threaded end portion of the rod. The second annular member is releasably secured to the brake mechanism housing and seals the open end portion thereof. A suitable spring member, such as a coil spring, a disc spring or the like, having a preselected spring constant, axially surrounds the annular members and is retained between the end portions thereof. With the second annular member immovably secured to the brake assembly housing, the spring member exerts a preselected force upon the first annular member to move with the rod and exert a force upon the second braking mechanism. By axially advancing the rod away from the second braking mechanism, the first annular member is advanced toward the second annular member to compress the spring member therebetween. The annular members are locked in position on the rod to maintain the spring member in a compressed state to permit safe removal of the entire spring assembly from the housing. In this manner, the spring assembly may be efficiently serviced or replaced with another spring assembly having a different spring constant.

Accordingly, the principal object of the present invention is to provide a brake mechanism which functions as a service brake to exert a preselected braking force upon a rotatable disc by a preselected spring force acting against fluid pressure in a chamber.

Another object of the present invention is to provide a brake mechanism in which loss of pressurized fluid to the fluid chamber automatically actuates a park brake to retain the braking pads in frictional engagement with the disc to prevent movement of the vehicle.

An additional object of the present invention is to provide a brake mechanism having a removable spring assembly for actuating the brake mechanism in which the spring member may be locked in a compressed state when spring assembly is removed from the housing to prevent an explosion of the spring and the other components and then provide for efficient replacement or servicing of the spring assembly.

These and other objects of this invention will be more completely disclosed in the following specification, the accompanying drawings and the appended claims.

DESCRIPTION OF THE PREFERRED EMBODIMENTS

Figure 3:
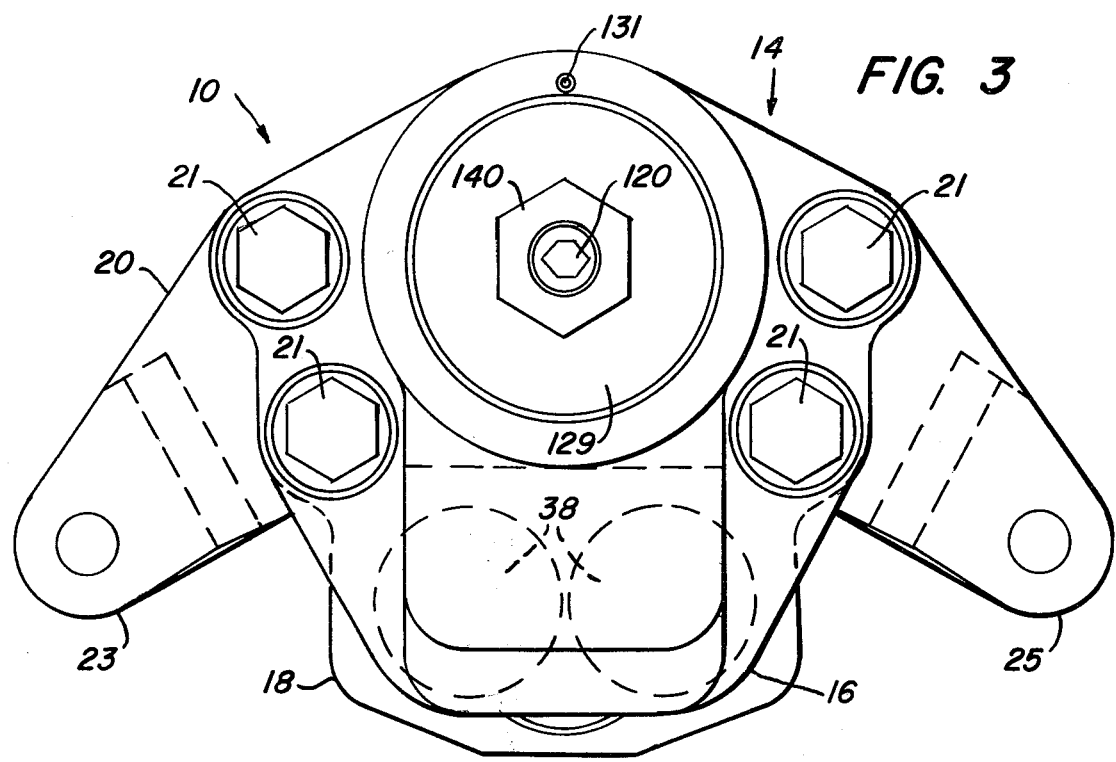
FIG. 3 is an end view of the brake mechanism, taken along the line 3—3 of FIG. 1, illustrating, in phantom, the braking pads that are secured to the outer half of the brake housing.

Referring to the drawings, there is illustrated a brake mechanism generally designated by the numeral 10 that is incorporated in a hydraulic circuit and functions to apply a braking force upon a rotatable disc 12. The disc 12, for example, may be mounted on a brake shaft of a vehicle drive train or drivingly connected to the vehicle wheels. In a specific embodiment, the brake mechanism 10 may be operatively associated with a conventional gear reduction system of a mine haulage vehicle, such as a shuttle car, in which the mechanism 10 is accessibly mounted on the vehicle for making repairs and adjustments.

Figure 1:
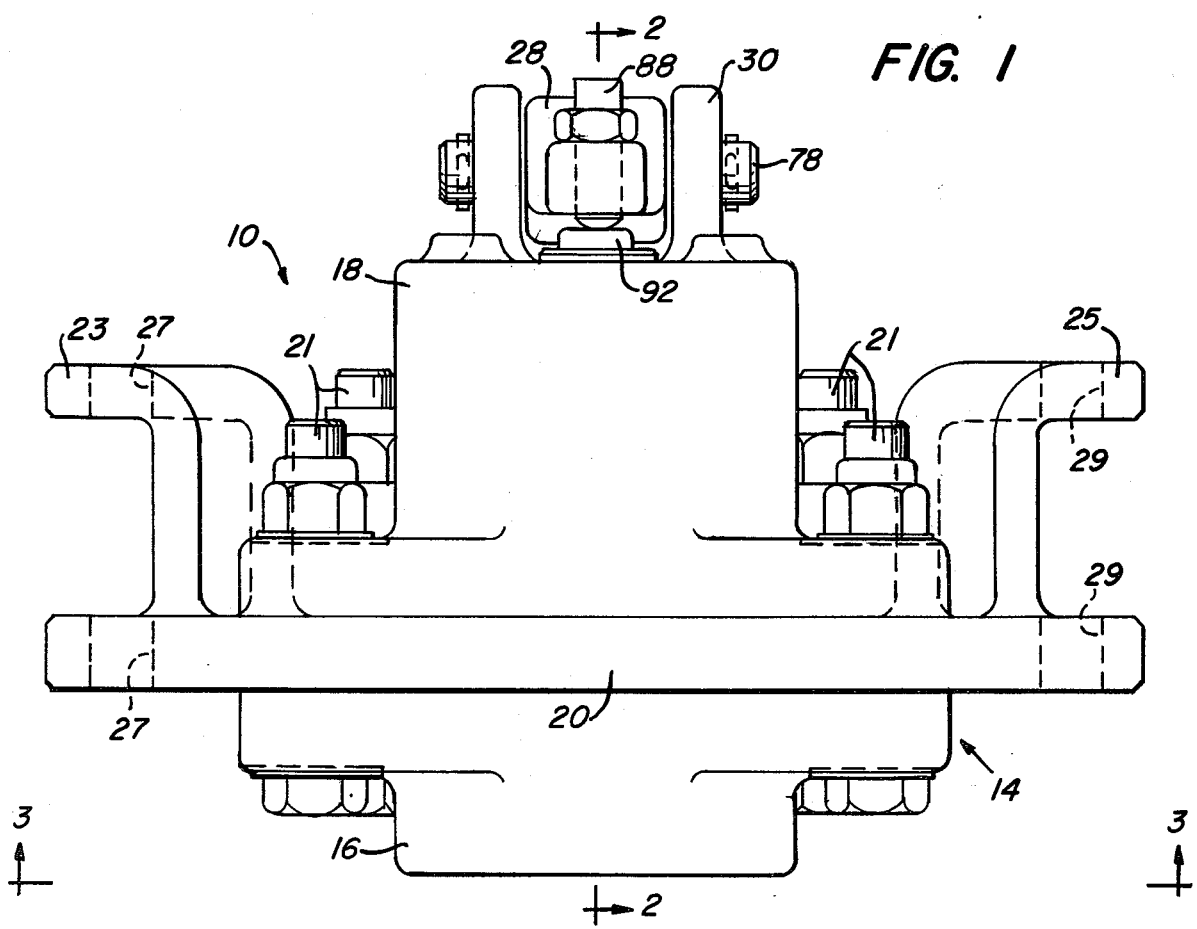
FIG. 1 is a top plan view of the brake mechanism illustrating a spacer bracket that is secured between the inner and outer brake housings for mounting the brake assembly on a vehicle frame adjacent the rotatable disc.

Referring to FIGS. 1 and 3, there is illustrated the brake mechanism 10 that includes a brake housing generally designated by the numeral 14 that has a first housing member 16 separated from a second housing member 18 by a spacer bracket 20. The spacer bracket 20 is secured to the housing members 16 and 18 by bolts 21 that extend through aligned bores of the bracket 20 and housing members 16 and 18. The spacer 20 is provided with outwardly extending arm portions 23 and 25 having bores 27 and 29 through which fastening devices may be extended to secure the bracket 20 to the sidewall of the vehicle for mounting the brake mechanism 10 adjacent the rotatable disc to be braked. With the brake housing 14 secured to the vehicle frame by the spacer bracket 20, the brake mechanism 10 is easily disassembled by removing the bolts 21 from the housing member 16 to free the member 16 from connection with the spacer bracket 20. With this arrangement, the components of the brake mechanism are conveniently accessible for repair or replacement, as will be further hereinafter discussed.

The first and second annular members 16 and 18 together with the spacer 20 form an annular chamber 31 having an opening 33 which extends through the housing member 16. A reciprocating brake actuator generally designated by the numeral 24 is sealingly positioned for axial movement in the chamber 31 and divides chamber 31 into a first chamber 22 rearwardly of actuator 24 for receiving pressurized fluid from a source and a second chamber 35 sealed from chamber 22 forwardly of the actuator 24. The actuator 24 reciprocates within the chamber 35. The fluid chamber 22 is connected to a hydraulic line through a fluid connection (not shown). Pressurized fluid is conducted to a chamber 22 to resist and balance the constant braking force generated by the brake actuator 24. When the fluid pressure in the chamber 22 is less than the braking force of the brake actuator 24, a resultant braking force is transmitted to a brake applicator generally designated by the numeral 26. A lever 28 that is pivotally mounted on an ear 30 extending outwardly from the second housing member 18 transmits the brake actuating force of the actuator 24 to the applicator 26.

Figure 2:
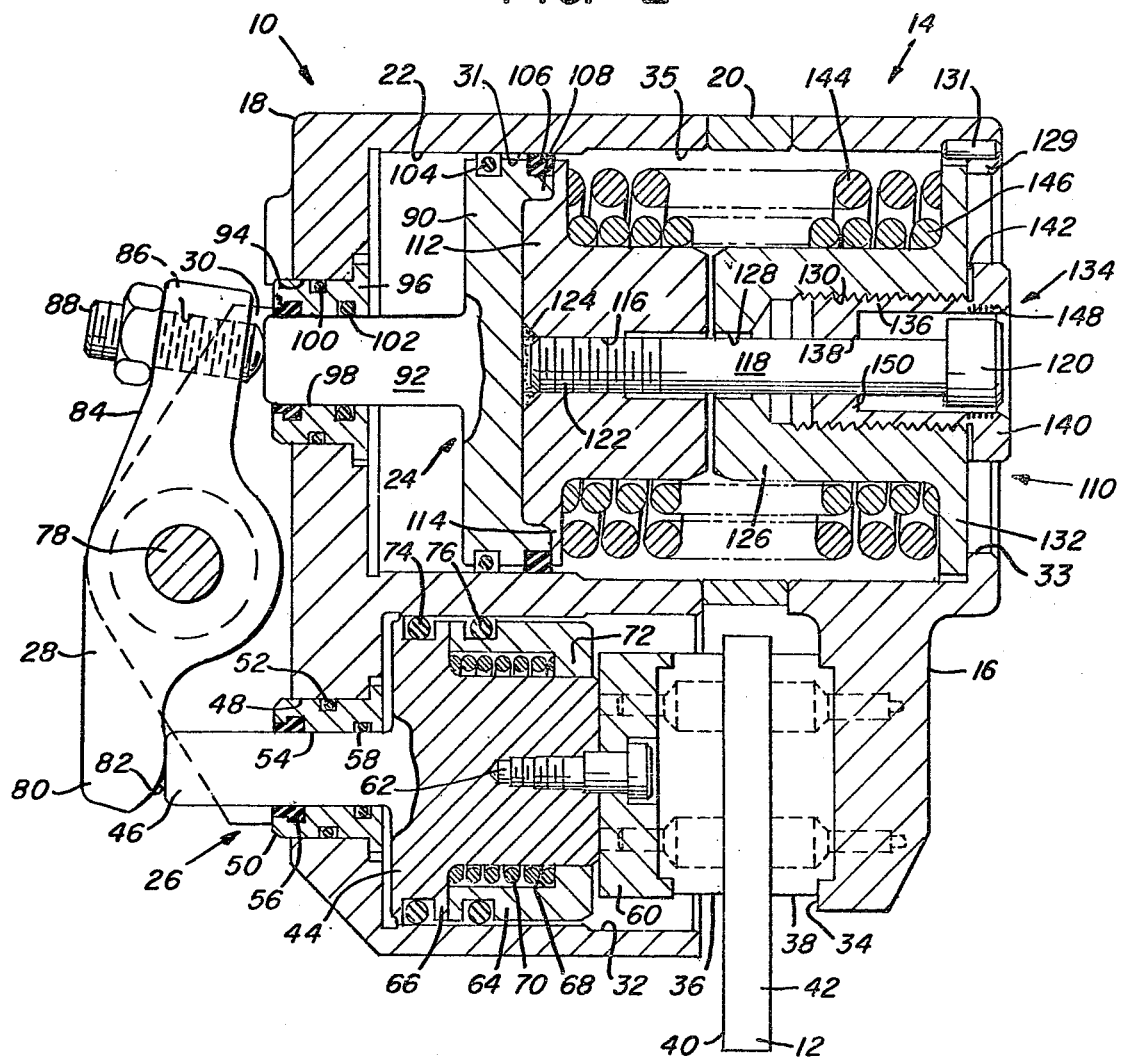
FIG. 2 is a sectional view, in side elevation, taken along the line 2—2 of FIG. 1, illustrating the braking pads positioned in braking engagement with the rotatable disc.

It should be understood that the sole function of the lever 28 is to transmit the brake actuating force of the brake actuator 24 to the brake applicator 26. The arrangement may be so modified that the brake actuator 24 is coaxially mounted with the brake applicator 26 for imparting a braking force upon the disc 12, as later described for the embodiment illustrated in FIGS. 4 and 5. The arrangement illustrated in FIGS. 1-3 is preferred where limitations in mounting space do not permit coaxially mounting of the brake actuator 24 with the brake applicator 26. Thus, the brake mechanism 10 is actuated by venting pressurized fluid from the chamber 22 and the mechanism is released by conducting pressurized fluid into the chamber 22.

The brake applicator 26 is slidably and sealingly disposed within a cup shaped recess 32 formed in the lower portion of the housing member 18. A slot 34 is formed by the lower portions of the housing members 16 and 18 adjacent to the recess 32 and receives the rotatable disc 12. Braking pads or linings 36 and 38 are nonrotatably secured to the end portion of the brake applicator 26 and the housing first annular member 16 within the slot 34. The brake actuating force transmitted by the lever 28 moves the applicator 26 axially in the recess 32 to thereby urge the braking pads 36 into braking engagement with the friction surface 40 of the disc 12. The braking pads 38 are secured to the housing member 16 and offer no frictional resistance to rotation of the disc 12 when the brake is released. Upon engagement of the pads 36 with the disc 12, the pads 38 frictionally engage the disc friction surface 42. In this manner, the braking pads 36 and 38 exert a braking force upon the disc 12 to overcome the torque of the rotating disc 12 to slow or stop the vehicle, as desired.

In greater detail, the brake applicator 26 includes an annular brake applicator piston 44 having a piston rod 46 integral therewith. The piston rod 46 extends through bore 48 in the lower portion of the housing second annular member 18. A guide plunger 50 is sealingly secured in the bore 48 by O-rings 52. Bore 54 of guide plunger 50 receives the piston rod 46 for axial movement relative to the guide plunger 50. Seals 56 and O-rings 58 prevent dirt from entering the recess 32 and maintain substantially frictionless movement of the piston rod 46 in the guide plunger bore 54.

The annular brake applicator piston 44 moves axially within the recess 32 toward and away from the disc 12. An annular abutment member 60 is axially and nonrotatably secured to the end portion of the piston 44 by a threaded member 62. Braking pads 36 are nonrotatably secured to the end portion of the abutment member 60 adjacent to the friction surface 40 of the disc 12. The braking pads 36 are thus arranged to move axially with the abutment member 60 in the slot 34 relative to the disc 12. The braking pads 38 are suitably secured to the lower end portion of the housing first annular member 16 and are axially aligned with the braking pads 36 opposite the disc friction surface 42.

A cup-shaped sleeve member 64 is slidably positioned in the recess 32 and is axially mounted on the annular brake applicator piston 44. The end portion of the sleeve member 64 abuts shoulder 66 of annular piston 44 to form an annulus 68 between the piston 44 and the sleeve member 64. A coil spring 70 is positioned within the annulus 68 and abuts shoulder 72 of the sleeve member 64 and the annular piston shoulder 66. The coil spring urges the annular piston 44 away from the disc 12 to thereby release the braking pads 36 and 38 from braking engagement with the friction surfaces 40 and 42 when the fluid pressure in the chamber 22 exceeds the brake actuating force of the brake actuator 24. O-rings 74 and 76 seal the annular piston 44 and sleeve member 64 relative to the recess 32.

As stated hereinabove, the brake actuating force is transmitted to the brake applicator 26 by the lever 28. The lever 28 is pivotally secured to the ear 30 by a lever pin 78. The lever 28 includes a lower end portion 80 having a bearing surface 82 and an upper end portion 84 having a threaded bore 86 for receiving adjusting screw 88. With this arrangement, axial movement of the brake actuator 24 is transmitted by the lever 28 as it pivots about the lever pin 78 to urge the bearing surface 82 of the lever end portion 80 into abutting relation with the end of piston rod 46. Consequently, the force acting upon the piston 44 overcomes the resistance offered by the coil spring 70 to move the braking pads 36 and 38 into braking engagement with the disc 12.

The brake actuator 24 is operable to transmit a preselected braking force through the lever 28 to the brake applicator 26 and the braking pads 36 and 38. The brake actuator 24 includes an annular actuating piston 90 that is slidably and sealingly disposed within the annular chamber 22. A piston rod 92 of the piston 90 extends through a bore 94 in the housing member 18. A guide plunger 96 is positioned within the bore 94 and includes a bore 98 for reciprocally receiving the piston rod 92. With this arrangement, the guide plunger 96 maintains axial alignment of the piston rod 92 as it reciprocates within the chamber 22 and bore 94. O-rings 100 and 102 maintain a seal for the guide plunger 96 relative to the housing member 18 and the piston rod 92.

An O-ring seal 104 surrounds the annular piston 90 and a felt seal 106 is bonded to piston shoulder 108 to provide a fluid tight seal between the fluid chamber 22 and the chamber 35 forward of the piston 90. A self-contained spring assembly generally designated by the numeral 110 is positioned within the annular chamber 35 forward of the piston 90 and functions to exert upon the piston 90 a preselected brake actuating force. When the fluid pressure in the chamber 22 is less than the spring force of the spring assembly 110, a braking force is applied to the disc 12.

The spring assembly 110 includes a plunger 112 slidably positioned in abutting relation with the annular piston 90 in chamber 22. Plunger 112 includes a flanged end portion 114 that engages in abutting relation the shoulder 108 of the piston 90 to thereby assure axial movement of the piston 90. The plunger 112 has a longitudinal bore 116 that is axially aligned with the piston rod 92. A rod member 118 having a an enlarged head 120 and a threaded end portion 122 is threadedly engaged to the plunger 112 within the threaded bore 116. In addition, weld 124 secures the rod end portion 122 to the plunger 112 so that axial movement of the rod 118 within the chamber 35 is transmitted to the plunger 112.

A second annular plunger 126 having a cup-shaped configuration is mounted on the rod member 118. The plunger 126 has an axial bore 128 that is aligned with the bore 116 of plunger 112. The bore 128 connects with a threaded bore 130 of increased diameter. The plunger 126 includes a flanged end portion 132 that serves to seal the open end portion 33 of the chamber 35. The flanged end portion 132 abuts the wall of the chamber 35. An annular shoulder 129 on housing 16 overlies the flanged end portion 132 of plunger 126. The plunger 126 is nonrotatably secured relative to the housing member 16 by a pin 131. With this arrangement, the plunger 126 is axially immovable and non-rotatable within the chamber 35.

The threaded bore 130 of the plunger 126 receives for axial movement relative thereto an adjusting sleeve generally designated by the numeral 134. The adjusting sleeve 134 has an outer threaded body portion 136 that is threadedly secured in the bore 130 of plunger 126. The adjusting sleeve 134 has a bore 138 extending through the body portion 136 in which the rod member 118 is positioned for axial movement. The adjusting sleeve 134 includes a cap 140 having an inner serrated surface 142 that is arranged to move in and out of engagement with the outer surface of the plunger flanged end portion 132. With this arrangement, when the adjusting sleeve 134 is advanced into the threaded bore 130 of the plunger 126, as illustrated in FIG. 2, further advancement of the adjusting sleeve 134 is prevented when the serrated edge 142 engages the flanged end portion 132.

A pair of concentrically positioned coil springs 144 and 146 having a preselected spring constant surround the plungers 112 and 126 and abut the respective flanged end portions 114 and 132. The abutment provided for the plunger 126 by the shoulder 129 of housing member 16 immovably secures the plunger 126 relative to the rod member 118. Accordingly, the springs 144 and 146 act upon the plunger flanged end portion 114 to urge the plunger 112 into contact with the piston 90. Thus, the piston 90 is moved axially toward the lever 28. The piston rod 92 moves through the bore 98 of the guide plunger 96 and into contact with the end portion of the lever adjusting screw 88. The lever 28 then pivots about the pin 78 to transmit the brake actuating force through the piston rod 46 and to the brake applicator piston 44 and thereby move the braking pads 36 secured to the end of the piston 44 into braking engagement with the friction surface 40 of the disc 12. With the above described arrangement, a resultant balancing force is exerted upon the actuating piston 90 to retain the piston 90 immovable within the chamber 22 when the fluid pressure in the chamber 22 exceeds or is equal to the spring force exerted by the coil springs 144 and 146 upon the piston 90.

To release the braking force upon the pads 36 and 38, fluid is conducted into the chamber 22 until the fluid pressure exceeds the force of the springs 144 and 146. The piston 90 and the piston rod 92 move axially in a direction away from the adjusting screw 88 such that the actuating force is removed from the lever 28 and consequently, the braking pads 36 and 38 move out of braking engagement with the disc 12. Accordingly, by venting the chamber 22, the braking action is once again initiated when the spring force exceeds the fluid pressure in chamber 22. In this fashion, the brake assembly 10 operates as a service brake in which the volume of fluid in the chamber 22 controls the magnitude of the braking force exerted upon the disc 12.

In the event of failure in the hydraulic circuit of the brake, as for example a loss of electric power to the pump which supplies the pressurized fluid to the chamber 22, the brake assembly 10 remains operational. Without fluid in chamber 22 to resist the force of the springs 144 and 146, the braking force transmitted through the lever 28 to the actuator piston rod 46 maintains the braking pads 36 and 38 in braking engagement with the disc 12. With this arrangement, an auxiliary or parking brake is automatically actuated to generate a resistive force upon the actuating piston 90.

A spring assembly having a preselected spring force may be inserted in the housing 14 to meet any given torque requirement. The versatility provided by the self-contained spring assembly 110 eliminates the necessity of installing an entire brake assembly on the vehicle to meet a change in the torque of the brake shaft. Thus, by merely exchanging spring assemblies in the brake housing 14, a variable braking force may be provided for the brake mechanism 10.

Continued application of the braking pads 36 and 38 into braking engagement with the disc 12 produces wear of the pads. Accordingly, as the thickness of the braking pads 36 and 38 decreases, increased displacement of the actuating piston 90 is required to maintain the braking pads in braking engagement with the disc 12. As the thickness of the braking pads decreases, the actuating piston 90 moves to a position closer to the rear wall of the actuating chamber 22. In addition, the rod member 118 secured to the plunger 112 moves axially in the bores 128 and 138 under the force of the coil springs 144 and 146. The relative position of the rod member 118 in the adjusting sleeve 134 provides a visual indication of the wear condition of the braking pads 36 and 38. Therefore, by providing a plurality of reference points 148 on the inside surface of the body portion 136, the amount of wear of the braking pads 36 and 38 is indicated by the alignment of the end of the cap 120 with a particular reference point. Eventually, the cap 120 will reach a position within the adjusting sleeve 134 indicating that there is need to install new braking pads.

Further in accordance with the present invention, provision is made to efficiently remove the spring assembly 110 from the brake housing 14. Replacement of the spring assembly 110 is necessitated when it is desired to vary the spring force of the brake actuator 24 or when it is desired to release the parking brake when the fluid chamber 22 has been vented so that the vehicle may be moved. Replacement of the spring assembly 110 is accomplished by threadedly retracting the adjusting sleeve 134 out of the plunger 126. When the adjusting sleeve 134 has been retracted to a position where the shoulder 150 of the sleeve abuts the cap 120, continued rotation of the adjusting sleeve 134 in the same direction moves the rod member 118 and the plunger 112 axially in the chamber 22 to compress the springs 144 and 146. Axial movement of the plunger 112 will continue away from the forward face of the piston 90 until the adjacent faces of the plunger 112 and 126 are in abutting relation. With this arrangement, the adjusting sleeve 134 is threadedly engaged to the plunger 126 and is, therefore, axially immovable relative thereto. Thus, with the shoulder 150 and the cap 120 positioned in abutting relation, the rod member 118 is axially immovable relative to the plunger 126 and the springs are locked in a compressed state to prevent their explosion when removed from the housing 14.

With the coil springs 144 and 146 locked in a compressed state, the housing member 16 is released from connection with the spacer bracket 20 by removing the bolts 21. With the housing member 16 removed from the brake mechanism 10, the spring assembly 110 is then freely removable from the chamber 35. In this manner, the spring assembly 110 may be efficiently serviced or replaced without need to separately remove the springs 144 and 146 from the other components of the brake mechanism. After servicing, when the spring assembly 110 is inserted back into the chamber 35 and the housing 16 bolted to the bracket 20, the springs 144 and 146 are fully operable to exert the same actuating force upon the piston 90.

Figure 4:
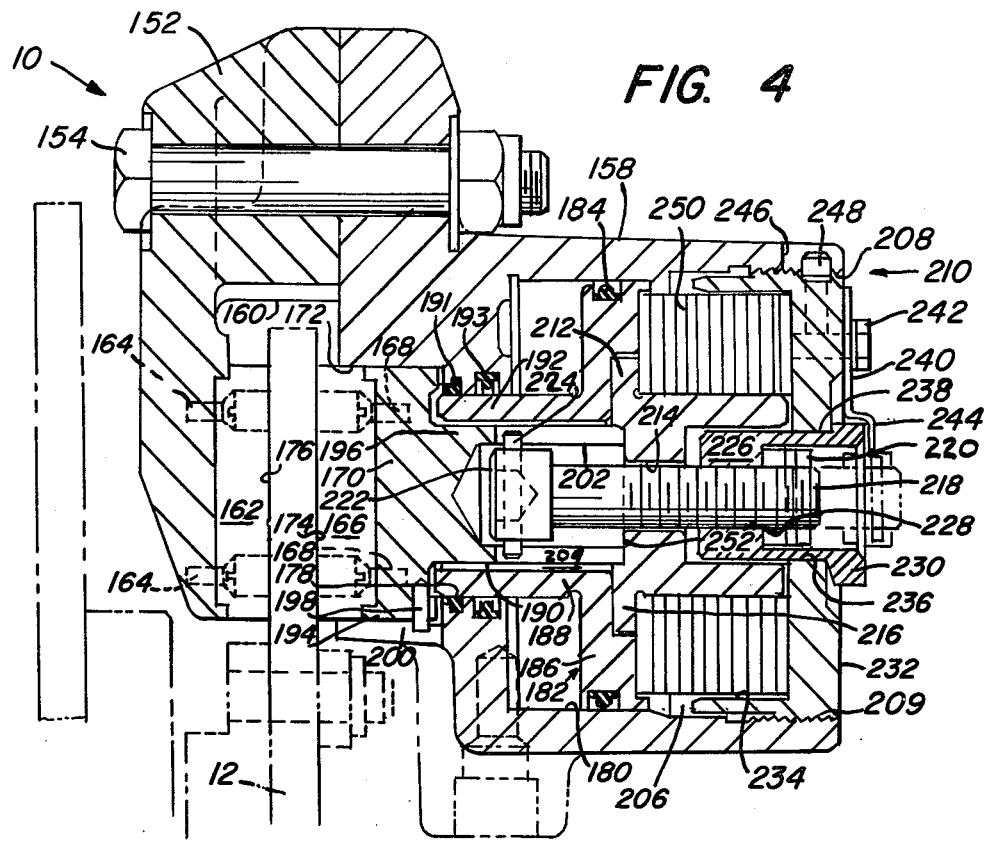
FIG. 4 is a sectional view in side elevation of another embodiment of the brake mechanism.
Figure 5:
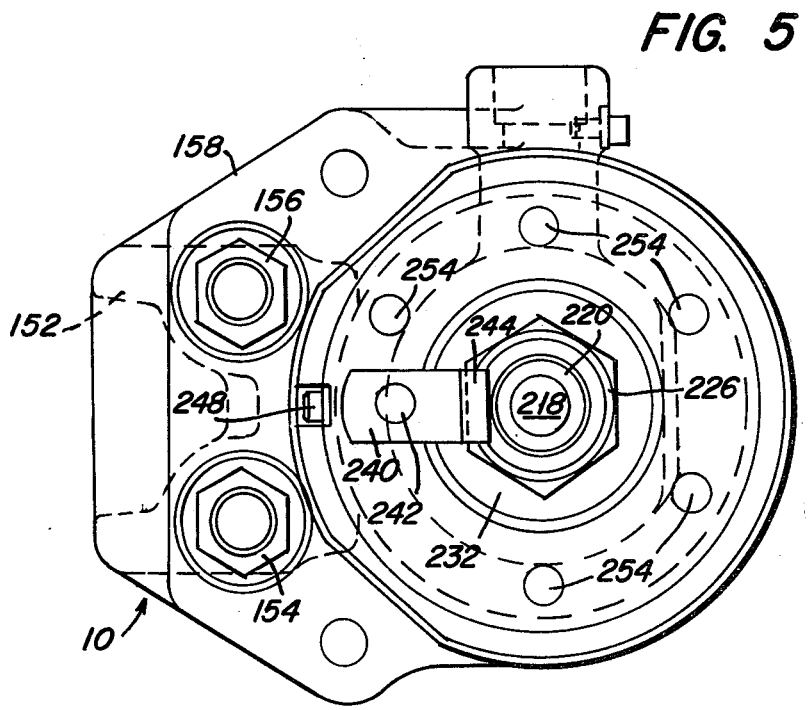
FIG. 5 is an end view of the brake mechanism, illustrated in FIG. 4.

Referring to FIGS. 4 and 5, there is illustrated another embodiment of the brake mechanism 10 that is hydraulically controlled to apply a braking force upon the rotatable disc 12. As stated hereinabove, the disc 12 may be operatively connected to a vehicle wheel or mounted on a brake shaft of a vehicle drive train. However, in any case, the brake assembly 10 is mounted to permit accessibility for making repairs and adjustments. The brake assembly 10 illustrated in FIG. 4 includes an outer housing 152 that is connected by nut and bolt assemblies 154 and 156 to a housing cylinder 158. The outer housing 152 and housing cylinder 158 form a slot 160 for receiving the rotatable disc 12. Braking pads or brake linings 162 are nonrotatably secured to the lower end portion of housing 152 by threaded members 164. Positioned oppositely of the braking pads 162 within the slot 160 are braking pads 166 that are secured by threaded members 168 to a brake applicator 170. The brake applicator 170 is slidably retained within an cylindrical recess 172 of the housing cylinder 158. The application of a brake actuating force to the brake applicator 170 moves the applicator axially within the recess 172 to thereby urge the braking pads 166 and 162 into braking engagement with the friction surfaces 174 and 176 of the disc 12. The braking pads 162 and 166 are axially aligned opposite one another and do not frictionally engage the disc 12 when the brake is released.

The cylindrical recess 172 of the housing cylinder 158 is connected by a cylindrical passageway 178 to an annular fluid chamber 180. A brake actuator generally designated by the numeral 182 is axially movable within the chamber 180 and seals the open end portion thereof. A seal member 184 surrounds the brake actuator 182 and abuts the inner wall of the housing cylinder 158 to provide a fluid-tight seal around the actuator 182. As above discussed for the fluid chamber 22 of the brake assembly 10 illustrated in FIG. 2, the fluid chamber 180 in FIG. 4 is connected to a hydraulic line through a conventional fluid connection (not shown) to receive pressurized fluid from a source.

The brake actuator 182 includes an annular piston 186 that is slidably positioned within the fluid chamber 180 and includes a tubular portion 188 having an axial bore 190. The tubular portion extends through the passageway 178 in the housing 158 and includes an end portion 192 that is positioned in substantially abutting relationship with the brake applicator 170. Seal members 191 and 193 surround end portion 192 in the passageway 178.

The brake applicator 170 includes an enlarged end portion 194 that supports the braking pads 166, as hereinbefore described, and a tubular body portion 196 that extends rearwardly therefrom through the tubular member 188 of the piston 186. The end portion 194 and the body portion 196 of the brake applicator 170 are axially movable within the housing of cylinder 158 and nonrotatably retained therein by a pin 198 that extends through a longitudinal slot 200 of housing cylinder 158 into the end portion 194. The tubular body portion 196 includes an axial bore 202 and a longitudinal slot 204 that extends substantially the length of the body portion 196.

A chamber 206 extends forwardly of the brake actuator 182 in the housing cylinder 158 and has an open end portion 208 and a threaded portion 209. A spring assembly generally designated by the numeral 210 is positioned within the chamber 206 and seals the open end portion 208 of the housing 158. The spring assembly 210 exerts a preselected force upon the brake actuator 182. When the brake assembly 10 is maintained in a deactivated condition, the fluid pressure in the chamber 180 exerts a force upon the piston 186 sufficient to resist and balance the constant braking force exerted on the opposite face of the piston by the spring assembly 210. In this manner, the brake actuator 182 remains stationary within the chamber 180 so that the brake applicator 170 maintains the braking pads 166 removed from frictional engagement with the disc 12.

When the vehicle is to be slowed or brought to a complete stop, a preselected volume of fluid is discharged from the chamber 180 such that the fluid pressure in the chamber 180 is less than the actuating force exerted by the spring assembly 210 upon the piston 186. Accordingly, the piston 186 is displaced axially within the chamber 180 toward the disc 12 to thereby urge the tubular end portion 192 into abutting relation with the brake actuator 170. This moves the actuator 170 to, in turn, urge the braking pads 162 and 166 into frictional engagement with the disc 12.

The magnitude of the braking force applied to the disc 12 is determined by the volume of fluid vented from the chamber 180. Should a malfunction occur in the hydraulic system that supplies the pressurized fluid to the chamber 180, the brake assembly 10 remains operational. Thus, an interruption in the flow of fluid to the chamber 180 decreasing the fluid pressure in the chamber to less than the spring force of the assembly 210 axially displaces the piston 186 to move the applicator 170 toward the disc 12 so that the braking pads 162 and 166 engage the disc 12 to slow or stop the vehicle. Thus, with this arrangement, an auxiliary or parking brake is automatically actuated in the event the fluid pressure within the chamber 180 diminishes.

The spring assembly 210 includes a plunger 212 that is axially aligned with the brake actuator 182 and the brake applicator 170. The plunger 212 includes an axial bore 214 and an annular end portion 216 that is positioned in abutting relationship with the piston 186. A threaded bolt 218 having a nut 220 secured to one end portion thereof extends through the axial bore 214 of the plunger 212 for slidable axial movement relative thereto. The bolt 218 has at the opposite end portion a cap 222 that is secured to the bolt 218 by a pin 224. The end portion of the bolt 218 is positioned within the axial bore 202 of the brake applicator 170 with the pin 224 axially movable within the slot 204 so that the brake applicator 170 can move relative to the bolt 218.

A retractor 226 having a cup-shaped configuration has an axial threaded bore 228 threadedly secured to the bolt 218. The retractor 226 has a longitudinal body portion and a hexagonal end portion 230. An annular end cap 232 having an annular recess 234 and a bore 236 is engaged to the threaded portion 209 of the housing cylinder 158 to thus seal the open end portion of the cylinder 158. The retractor 226 extends through the bore 236 with the end portion 230 thereof positioned in abutting relationship with an outer shoulder 238 of the end cap 232.

A lock bar 240 is secured by a bolt 242 to the end cap 232 as illustrated in FIGS. 4 and 5. The lock bar 240 has an end portion 244 that is positioned in overlying abutting relationship with the hexagonal end portion 230 of the retractor 226. With this arrangement, the retractor 226 is axially fixed within the housing cylinder 158 on the bolt 218 by the abutting relationship of the shoulder 238 and the lock bar end portion 244 with the end portion 230. The housing cylinder 158 has a transverse slot 246 that overlies a transverse bore within the end cap 232 for receiving a set screw 248. The set screw 248 is advanced through the transverse bore 246 and the end cap 232 into engagement with the bolt 242. In this manner, the end cap 232 is nonrotatably secured to the housing cylinder 158.

A resilient member such as a Belleville spring or a disc spring 250 having a preselected spring constant is positioned in surrounding relationship with the plunger 212 having the end portions of the spring 250 positioned in abutting relationship at one end with the end cap 232 and at the other end with the piston 186 and the annular end portion 216 of the plunger 212. With the end cap 232 axially immovable within the housing cylinder 158, the disc spring 250 exerts an axial force upon the plunger 212 and the piston 186. Accordingly, the spring force is transmitted through the piston 186 to the brake applicator 170 to thereby axially displace the brake applicator 170 and urge the braking pads 162 and 166 into frictional engagement with the rotating disc 12.

The spring assembly 210 may be removed from the housing cylinder 158 in much the same manner as hereinabove described for the spring package 110, illustrated in FIG. 2. The spring assembly 210 may be removed in order to replace the spring 250 for a spring of a different force constant or in order to release the parking brake when the fluid chamber 180 has been completely vented to permit moving the vehicle. To remove the spring assembly 210 from the housing cylinder 158, the lock bar 240 is removed from abutting relation with retractor end portion 230. Then the retractor is rotated in a clockwise direction retracts the bolt 218 in the axial bore 202 of the tubular body portion 196 of brake applicator 170. The pin 224 in the slot 204 prevents rotation of the bolt 218 until the cap 222 contacts the shoulder 252 of plunger 212. Then, further rotation of the retractor 226 retracts the bolt 218 and nut 220 to the position illustrated, in phantom, in FIG. 4. The cap 222 of bolt 218 in this position abuts the shoulder 252 of plunger 212. In this manner, the bolt 218 retracts the plunger 212 away from the disc 12 to compress the disc spring 250 between the plunger end portion 216 and the base of the end cap 232. With the spring in a fully compressed state, the forward end portion of the plunger 212 abuts the base of the end cap 232 and the cap 222 of the bolt 218 abuts the plunger shoulder 252. The spring assembly 210 is now locked in a compressed state restrained from exploding and prepared for convenient and efficient removal as a unit from the housing cylinder 158.

Removal of the spring assembly 210 is accomplished by first removing the set screw 248 from the slot 246 and the bore in the end cap 232. In addition, the bolts 254 that secure the end cap 232 to the housing cylinder 158, as illustrated in FIG. 5, are removed. Then, by applying an additional torque to the retractor 226, the end cap 232 together with the remaining components of the spring assembly 210 are axially retracted out of the chamber 206 of the housing cylinder 158. Thus, the spring assembly 250 is conveniently and safely removed from the housing cylinder 158 for repair or replacement. To restore the brake mechanism 10 to service, the spring assembly 250 is positioned in the housing cylinder 158 and the end cap 232 bolted in place. Then the retractor 226 is rotated in a counterclockwise direction until nut 220 abuts the shoulder of the retractor as illustrated in FIG. 4. The lock bar 240 is replaced so that the end portion 244 contacts the retractor end portion 230.

According to the provisions of the patent statutes, we have explained the principle, preferred construction and mode of operation of our invention and have illustrated and described what we now consider to represent its best embodiments. However, it should be understood that, within the scope of the appended claims, the invention may be practiced otherwise than as specifically illustrated and described.

We claim:

1. An improved brake mechanism comprising, a brake housing, said brake housing including a first housing member and a second housing member, said first and second housing members being positioned in spaced relation, a spacer member positioned between and in abutting relation with said first and second housing members, bolt means extending through said first housing member, said spacer member, and said second housing member for releasably connecting said first and second housing members and said spacer member, a chamber formed by said first and second housing members and said spacer member, said chamber having a first open end portion and a second open end portion, a brake actuator movably positioned within said chamber and having an end portion extending through said second open end portion of said chamber, a lever member pivotally connected to said second housing member and having one end portion adjacent said brake actuator end portion, a cup-shaped recess formed in said second housing member and positioned below said chamber, an opening extending through said second housing member into said cup-shaped recess, a slot in said brake housing formed by said first and second housing member and said spacer member, said slot being positioned adjacent to said recess and adapted to receive a rotor member, a brake applicator slidably positioned within said recess, said brake applicator having an end portion extending out of said recess and through said opening of said second housing member to a position adjacent said lever other end portion, said brake actuator being operable to pivot said lever and move said brake applicator into braking engagement with the rotor member, means to urge said brake applicator into a brake disengaged position, seal means surrounding said end portion of said brake actuator for sealing said second open end portion of said chamber, said chamber being adapted to receive pressurized fluid from a source to overcome a force applied by said brake actuator, a first annular member positioned in said chamber in abutting relation with said brake actuator, an axial bore in said first annular member, a second annular member positioned in said chamber and closing said first open end portion of said chamber, an axial bore in said second annular member, a rod member extending through said axial bores of said first and second annular members, said rod member having a portion positioned within said axial bore of said first annular member and a portion positioned within said axial bore of said second annular member, said rod member having an enlarged first end portion positioned for movement in said axial bore of said second annular member, a retractor member positioned in said bore of said second annular member, a bore extending through said retractor member, said rod member extending through said bore of said retractor member, resilient means positioned between said first and second annular members and having opposite end portions positioned in abutting relation with said first and second annular members respectively, said resilient means being operable to exert a preselected spring force through said first annular member upon said brake actuator and axially move said brake actuator to apply a force upon said brake applicator when the fluid pressure in said chamber is less than the force exerted by said resilient means on said brake actuator, and said retractor member being operable upon rotation to move said first and second annular members in abutting relation and compress said resilient means between said first and second annular members to permit removal of said first and second annular members, said resilient means, said rod member, and said retractor member as a single unit from said chamber first open end portion.

2. An improved brake mechanism as set forth in claim 1 which includes,
said brake actuator having a shoulder portion positioned oppositely of said first annular member,
said first annular member having a cylindrical body portion with a flanged end portion, said flanged end portion being movable into and out of abutting relation with said brake actuator shoulder,
said second annular member having a cylindrical body portion with a flanged end portion,
said first annular member cylindrical body portion positioned adjacent to said second annular member cylindrical body portion,
said first housing member having an inturned flanged end portion at said chamber first open end portion,
said second annular member flanged end portion abutting said first housing member inturned flanged end portion,
said resilient means positioned in surrounding relation with said cylindrical body portions of said first and second annular member, and
said resilient means having opposite end portions positioned in abutting relation with said flanged end portions of said first and second annular members so that said resilient means acts upon said first annular member flanged end portion to move said brake actuator toward said one end portion of said lever.

3. An improved brake mechanism as set forth in claim 1 which includes,
said rod member having a second end portion secured to said first annular member within said axial bore thereof,
said retractor member having a body portion threadedly engaged to said second annular member within said axial bore thereof,
said retractor body portion and said bore forming a shoulder portion,
said shoulder portion being movable into abutting relation with said rod member enlarged first end portion upon rotation of said retractor member out of said first housing member, and
said retractor member being operable upon continued rotation to further move said rod member enlarged first end portion and move said first annular member away from said brake actuator to fully compress said resilient means between said first and second annular members.

4. An improved brake mechanism as set forth in claim 1 which includes,
said retractor member arranged to move into abutting relation with said rod member enlarged first end portion and restrain said rod member from moving axially relative to said retractor member to lock said resilient means in a compressed state and permit removal of said resilient means from said chamber of said brake housing.

5. An improved brake mechanism as set forth in claim 1 wherein,
said spacer member includes outwardly extending arm portions, and
said arm portions having bores adapted to receive fastening means for releasably mounting said first and second housing members relative to the rotor member.

* * * * *